United States Patent Office 3,091,595
Patented May 28, 1963

---

3,091,595
CYANO-SUBSTITUTED POLYAMIDES AND THEIR USE AS CURING AGENTS FOR POLYEPOXIDES
Thomas F. Mika, Orinda, Calif., assignor to Shell Oil Company, a corporation of Delaware
No Drawing. Filed Mar. 22, 1956, Ser. No. 573,100
8 Claims. (Cl. 260—18)

This invention relates to a new class of polyamide derivatives and to a method for their preparation. More particularly, the invention relates to new cyano-substituted polyamides, to the used of these materials, particularly as curing agents for polyepoxides, and to a method for preparing the new cyano-substituted polyamides.

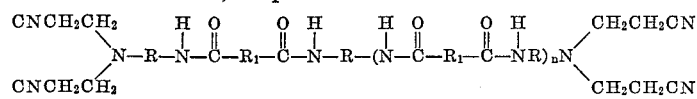

Specifically, the invention provides new and particularly useful polyamide derivatives which are outstanding curing agents for polyepoxides comprising cyano-substituted polyamides obtained by reacting alpha,beta-ethylenically unsaturated nitriles, such as acrylonitrile, with thermoplastic polyamides of polycarboxylic acids and aliphatic polyamines having at least two primary amino groups. The invention further provides a method for curing polyepoxides using the above-described novel cyano-substituted polyamides.

Polyepoxides, such as the commercially available polyglycidyl ethers of polyhydric phenols, may be cured to insoluble infusible products by the addition of certain polyamides. The use of the polyamides as curing agents is rather limited, however, because of their poor compatibility characteristics with the systems containing the polyepoxides. This places a restriction on the amount of the polyamide that may be added as well as in some cases prevents its entire use with some of the polyepoxide compositions. In addition, the polyamides found useful as curing agents have rather high viscosities. This makes them difficult to handle as well as places a restriction on the amount of polyamide that can be utilized in the desired composition. Furthermore, mixtures of the polyepoxides and polyamides have a rather short pot life, i.e., they gel very quickly at room temperature. Finally, the products prepared from the polyepoxides and polyamides sometimes fail to have the degree of distensibility and flexibility required for many applications.

It is an object of the invention, therefore, to provide a new class of polyamide derivatives. It is a further object to provide new cyano-substituted polyamides and a method for their preparation. It is a further object to provide new cyano-substituted polyamides which are particularly useful and valuable as curing agents for polyepoxides. It is a further object to provide new cyano-substituted polyamides which have improved compatibility with polyepoxide compositions. It is a further object to provide new polyamide derivatives having lower viscosities. It is a further object to provide new polyamide derivatives that give polyepoxide-polyamide compositions having greatly increased pot life. It is a further object to provide new cyano-substituted polyamides which cure polyepoxides to form hard flexible infusible products. It is a further object to provide a new method for curing polyepoxides. These and other objects of the invention will be apparent from the following detailed description thereof.

It has now been discovered that these and other objects of the invention may be accomplished in part by cyano-substituted polyamides obtained by reacting alpha,beta-ethylenically unsaturated nitriles, such as acrylonitrile, with thermoplastic polyamides of polycarboxylic acids and aliphatic polyamides having at least two primary amino groups.

It is believed that in the reaction between the nitrile and the polyamide, the nitrile adds to a nitrogen atom to form a cyanoethyl group, such as

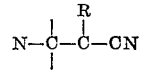

Thus, for example, when four moles of acrylonitrile reacts with a mole of a polyamide of the formula

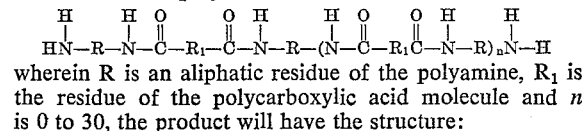

wherein R is an aliphatic residue of the polyamine, $R_1$ is the residue of the polycarboxylic acid molecule and $n$ is 0 to 30, the product will have the structure:

Further, for example, when 2 moles of acrylonitrile react with a carboxyl terminated polyamide of the formula

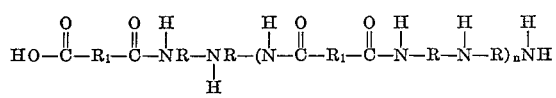

wherein $R_1$, R and $n$ are as described above, the products will have the formula

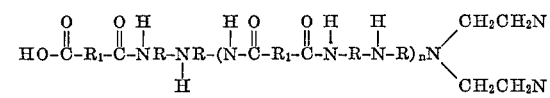

It has been found that the above-described cyano-substituted polyamides are good curing agents for polyepoxides. Further, they have much lower viscosities than the polyamides themselves as well as having much better compatibility with the polyepoxides. As a result, the new polyamides may be used in a variety of proportions in the preparation of all types of compositions with the polyepoxides. As more of the new polyamides may be tolerated in the compositions, the compositions tend to display more of the superior properties of the polyamides as well as have a lower cost. Further advantage is also found in the fact that the polyepoxide compositions containing these new cyano-substituted polyamides have much longer shelf life and can be stored or worked for much longer periods of time before the mixture gels. In addition, the new cyano-substituted polyamides tend to impart unexpected improvement in flexibility and distensibility of the resulting cured products.

The polyamides used in the preparation of the new cyano-substituted derivatives comprise the thermoplastic soluble polyamides of polycarboxylic acids and aliphatic polyamines having at least two primary amino groups. The polycarboxylic acids used in the preparation of such polyamides may be aromatic, aliphatic or cycloaliphatic, such as, for example, glutaric, adipic, pimelic, suberic, azelaic, sebacic terephthalic, isophthalic, phthalic, chlorophthalic, cyclohexanedicarboxylic, pyromellitic, octadecadiendioic, eicosanedioic, and polymeric fatty acids such as obtained by the polymerization of drying or semi-drying oil fatty acids as fatty acids derived from soybean, linseed, tung, perilla, oiticica, cottonseed, corn, tall, sunflower, safflower, dehydrated castor oil, and the like. Particularly preferred polycarboxylic acids to be used in preparing the polyamides comprising the aliphatic and cycloaliphatic acids are those containing no more than 30 carbon atoms, and still more preferable are the polymeric fatty acids derived from the unsaturated fatty acids containing less than 30 carbon atoms.

The aliphatic polyamines used in the preparation of the polyamides may be exemplified by diethylene triamine, tetraethylene pentamine, 1,4-diaminobutane, 1,3-diaminobutane, hexamethylene diamine, pentamethylene diamine and octamethylene diamine, and the like. Particularly preferred are the aliphatic saturated di- and triamines containing less than 18 carbon atoms and having at least two carbon atoms between the amino groups.

The polyamides may be prepared by any suitable method. They are preferably prepared by merely heating the polycarboxylic acid with the desired polyamines in theoretical proportions. If amino-terminated polyamides are desired, the aliphatic polyamines should be used in excess, while if carboxyl terminated polyamides are desired, the polycarboxylic acids should be used in excess. Temperatures employed in the reaction generally vary from about 50° C. to 200° C., and more preferably between 100° C. and 150° C. Catalysts may be employed to speed the reaction, but in most cases the reaction proceeds at a satisfactory rate merely under the influence of heat. The reaction may be accomplished in the presence or absence of solvents or diluents depending on the nature of the reactants.

A method for preparing polyamides of the polymeric fatty acids and aliphatic polyamines is described in Cowan et al.—U.S. 2,450,940.

The preparation of several polyamides is shown below.

POLYAMIDE A 1 mole of dimeric fatty acids obtained by polymerizing soyabean oil fatty acids and 3 moles of diethylene triamine were mixed together in a kettle and heated for 2 hours at 150° C. Vacuum was applied to remove up to 1 mole of diethylene triamine. The resulting product was a polyamide which contained approximately two $NH_2$ groups and two NH groups. The product had a viscosity of 450 poises at 25° C., basic nitrogen 6.2% and acid No. of 3. This product will be referred to hereinafter as Polyamide A.

POLYAMIDE B 1 mole of dimeric fatty acids obtained by polymerizing soyabean oil fatty acids and 2 moles of diethylene triamine were mixed together in a kettle and heated for 2 hours at 150° C. The mixture was vacuum flashed to remove any excess diethylene triamine. The resulting product was a polyamide having approximately two $NH_2$ groups and three NH groups. The product contained 5.6 basic nitrogen. This product will be referred to hereinafter as Polyamide B.

POLYAMIDE C

A polyamide was prepared from dimerized soyabean oil fatty acids and aqueous ethylene diamine. The dimerized fatty acids and the soyabean oil acids were placed in a vessel. While the vessel was being flushed with nitrogen and the mixture stirred, heat was applied until the temperature reached 130° C. At this temperature ethylene diamine was added gradually. The temperature was raised in 90 minutes to 200° C. where it was maintained for 3 hours. During the last hour a vacuum of 25 inches was applied. The product was allowed to cool slightly and was then poured out over Dry Ice to solidify. The resulting polyamide had the following properties:

Acid number _____ 5.6
Amine number _____ 11.3
Viscosity at 25° C. (Gardner-Holdt, 35% solution in butanol-toluene 1:1) _____ B–C
Gel time at 200° C. _____ sec__ 75
Ball and ring melting point _____ ° C__ 105

This product will be referred to hereinafter as Polyamide C.

The preferred polyamides prepared as above are soft to hard solids having a molecular weight between about 1,000 to 10,000. The solids are thermoplastic and preferably have melting points below about 200° C. The polyamides are soluble in solvents, such as acetone, cyclohexanone, benzene, xylene and the like.

The alpha,beta-ethylenically unsaturated nitriles to be reacted with the above-described polyamides may be exemplified by acrylonitrile, methacrylonitrile, fumaric or maleic dinitriles, cinnamic nitrile and the like. Particularly preferred are the 2-alkenals containing up to 6 carbon atoms. Acrylonitrile is especially preferred.

The reaction between the unsaturated nitriles and the polyamides may be accomplished by merely heating the two components together in the desired proportions. The reaction often proceeds at temperatures as low as 20–25° C., but it is generally preferred to use elevated temperatures which range from about 50° C. to 150° C. Atmospheric, superatmospheric or subatmospheric pressures may be utilized as desired.

The amount of the nitrile added should be sufficient to furnish one mole for every amine hydrogen atom to be reacted. All of the amine nitrogen atoms can be and preferably are in some cases reacted with the nitrile. However, most active curing agents are obtained when one or more of the amine hydrogen atoms remains unreacted. Cyano-substituted polyamides that have exceptionally superior compatibility characteristics are obtained when from 50% to 100% of the amine hydrogen atoms are reacted. It should be understood that the expression "amine hydrogen" or "NH" groups as used herein refers only to the primary and secondary amine groups and not the group in the amide 

 group.

The reaction may be carried out in the presence or absence of solvents or diluents. Suitable solvents include, among others, dioxane, diethyl ether, alkyl ethers of polyhydric alcohol, carbon tetrachloride, benzene, xylene and the like and mixtures thereof.

The cyano-substituted polyamides may be recovered from the reaction mixture by any suitable means, such as precipitation, extraction, distillation and the like.

The novel cyano-substituted polyamides of the invention will vary from thick viscous liquids to hard solids depending on the molecular weight, the molecular weight varying generally from about 1,000 to 50,000. Those prepared from liquid polyamides will have lower viscosities than the original polyamides, themselves, and the solid ones have lower melting points. All of the new cyano-substituted polyamides have excellent solubility and compatibility characteristics and are distinguished in this regard from the plain unsubstituted polyamides.

As noted above, the new cyano-substituted polyamides are particularly valuable as curing agents for polyepoxides as they are highly compatible therewith and act to convert the polyepoxide into an insoluble infusible product.

The polyepoxides may be cured with the new cyano-substituted polyamides by merely mixing the two components together. The reaction occurs slowly at lower temperatures and for best results it is best to heat the mixture between about 50° C. and 280° C. Particularly preferred temperatures range from about 80° C. to about 200° C.

The amount of the cyano-substituted polyamide to be employed in the cure of the polyepoxide may vary over a considerable range. Amounts of the derivative can range from about 5 parts to 100 parts of polyepoxide up to as high as 200 parts of the polyamide per 100 parts of polyepoxide. Best results are obtained, however, when the adduct is employed in amounts varying from 10 to 30 parts per 100 parts of polyepoxide.

In curing the polyepoxides, it is usually desirable to have the polyepoxide in a mobile condition when the polyamide is added in order to facilitate mixing. The polyepoxides, such as the glycidyl polyether of polyhydric phenols, are generally very viscous to solid materials at ordinary temperature. With those that are liquid, but too viscous for ready mixing, they are either heated to reduce the viscosity, or have a liquid solvent added thereto in order to provide fluidity. Normally solid members are likewise either melted or mixed with a liquid solvent. Various solvents are suitable for achieving fluidity of the polyepoxide. These may be volatile solvents which escape from the polyepoxide compositions containing the adduct by evaporation before or during the curing such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc., and/or alcohols such as ethyl, isopropyl or n-butyl alcohol solvents which remain in the cured compositions may also be used, such as diethyl phthalate, dibutyl phthalate and the like, as well as cyano-substituted hydrocarbons, such as acetonitrile, propionitrile, adiponitrile, benzonitrile, and the like. It is also convenient to employ a polyepoxide, such as one of the glycidyl polyethers of the dihydric phenol, in admixture with a normally liquid glycidyl polyether of a polyhydric alcohol. In fact, two or more of any of the polyepoxides may be used together as mixtures. In such a case, the amount of the cyano-substituted polyamide added and commingled is based on the average epoxide equivalent weight of the polyepoxide.

Various other ingredients may be mixed with the polyepoxide subject to cure with the cyano-substituted polyamide including pigments, fillers, dyes, plasticizers, resins, and the like.

The curing agent-polyepoxide system described above may be utilized for a great variety of important applications. They are particularly valuable in the preparation of coating compositions, that may be air dried or baked. In these applications, it is generally desirable to combine the polyepoxide and polyamide derivative and desired solvents or other film-forming materials, and then apply this mixture to the surface to be coated. The coatings may be allowed to set at room temperature or heat may be applied.

The polyepoxide-polyamide derivative combination is also very useful in the preparation of pottings and castings. In this application, the polyepoxide and cyano-substituted polyamide are combined with any suitable solvent or fillers and then placed in the desired mold or casting and the casting heated to the desired temperature.

The polyepoxide-polyamide derivative combination is also very valuable in the preparation of laminates. In this application, the sheets of fibrous material are first impregnated with the mixture of polyepoxide and polyamide derivative. This is conveniently accomplished by dissolving the components in a suitable solvent such as acetone. The sheets of fibrous material are then impregnated with this mixture by spreading it thereon or by dipping or otherwise immersing them in the impregnant. The solvent is conveniently removed by evaporation and the mixture is allowed to cure to the fusible resin stage. Although this operation may be conducted at lower temperatures, it is preferred to use somewhat higher temperatures, such as about 50° C. to 200° C. with the impregnated sheet stock passing through or hanging free in an oven or other suitable equipment. The resinification is arrested before infusible products occur by cooling. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, glass cloth that has been given prior treatment with well known finishing or sizing agents, therefor, such as chrome methacrylate or vinyl trichlorosilane.

In the above applications, the resulting cured products are characterized by their good hardness, durability and flexibility.

The polyepoxides to be cured with the new cyano-substituted polyamides include those organic compounds containing a plurality of epoxy groups, i.e.,

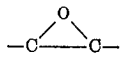

groups. These compounds may be saturated or unsaturated, aliphatic, cycloaliphatic, aromatic or heterocyclic and may be substituted if desired with substituents, such as chlorine atoms, hydroxyl groups, ether radicals and the like.

For clarity, many of the polyepoxides and particularly those of the polymeric type will be defined in terms of epoxy equivalent values. The meaning of this expression is described in U.S. 2,633,458.

If the polyepoxide material consists of a single compound and all of the epoxy groups are intact, the epoxy equivalency will be integers, such as 2, 3, 4, and the like. However, in the case of the polymeric type polyepoxide many of the materials may contain some of the monomeric monoepoxides and/or contain macromolecules of somewhat different molecular weight so the epoxy equivalent values may be quite low and contain fractional values. The polymeric material may, for example, have epoxy equivalent values, such as 1.5, 1.8, 2.5 and the like.

Various examples of polyepoxides that may be used in the process of the invention are given in U.S. 2,633,458 and it is to be understood that so much of the disclosure of that patent relative to examples of polyepoxides is incorporated by reference into this specification.

A group of polyepoxides which is not specifically illustrated in the above patent but which polyepoxides are of particular value in the process of the invention are the glycidyl ethers of novalac resins which resins are obtained by condensing an aldehyde with a polyhydric phenol. A typical member of this class is the epoxy resin from formaldehyde 2,2-bis 5-hydroxyphenol) propane novalac resin which contains as predominant constituent the substance represented by the formula

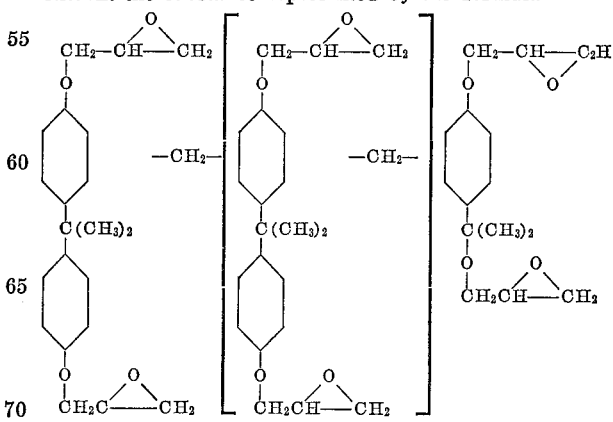

Anotoher group of preferred polyepoxides comprises the glycidyl ethers of alpha,alpha,omega,omega-tetrakis (hydroyaryl) alkanes as described and claimed in Schwarzer, Serial No. 466,208, filed November 1, 1954 now U.S. Patent No. 2,806,016.

The glycidyl polyethers of the polyhydric phenols obtained by condensing the polyhydric phenols with epichlorohydrin are often referred to as "ethoxyline" resins. See Chemical Week, vol. 69, page 27, for September 8, 1951.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

Polyepoxides Polyethers, A, B, C, etc., described in the examples are the polyepoxides described in U.S. 2,633,458 under these titles.

Example I

This example illustrates the preparation of a cyanoethylated polyamide by reacting acrylonitrile with Polyamide A described above.

75 parts of Polyamide A and 20 parts of acrylonitrile (mole ratio of about 1 to 4) were combined and heated to reflux (100° C.) for 1 hour. The resulting product was a liquid cyanoethylated polyamide having a viscosity of 375 poises at 25° C. This product thus had a much lower viscosity than the original Polyamide A which had a viscosity of 450 poises at 25° C.

The cyanoethylated polyamide produced above has greatly improved compatibility with polyepoxides, such as Polyethers A, B and C and can be combined therewith in a variety of proportions. The mixtures of the above-described cyanoethylated polyamide and Polyethers A, B and C also have an unexpectedly long shelf life and can be stored or worked for many hours before gelation. Further, the combinations of the above-noted cyanoethylated polyamide and Polyethers A, B and C cure to form very hard flexible solvent resistant coatings. These superior properties are illustrated by the following typical experiment:

60 parts of Polyether A was combined with 40 parts of the above-described cyanoethylated polyamide. The two products were easily mixed together and the mixture did not gel at room temperature until 24 hours. Films prepared from the mixture were very hard and clear after several days at room temperature. The original Polyamide A, on the other hand, was rather difficult to mix with the Polyether A in large proportions and a mixture of 70 parts of Polyether A and 30 parts of the polyamide gelled in 30 minutes at room temperature. Films prepared from this mixture were quite opaque after 2 days at room temperature.

Example II

This example illustrates the preparation of a cyanoethylated polyamide by reacting Polyamide A with sufficient acrylonitrile to react with all the amino hydrogen atoms.

75 parts of Polyamide A and 30 parts of acrylonitrile were combined and heated for one hour at 100° C. reflux temperature. The resulting product was a liquid cyanoethylated polyamide having a viscosity of 350 poises at 25° C. This product also had a much lower viscosity than the original Polyamide A which had a viscosity of 450 poises at 25° C.

This cyanoethylated polyamide also has greatly improved compatibility with polyepoxides, such as Polyethers A, B and C, and can be combined therewith in a variety of proportions. The mixtures of the above-noted cyanoethylated polyamide and Polyethers A, B and C also have unexpectedly long shelf life and can be stored or worked for many hours after gelation. Further, the combinations of the above-noted cyanoethylated polyamide and Polyethers A, B and C cure to form very hard flexible solvent resistant coatings. These superior properties are illustrated by the following typical experiment:

60 parts of Polyether A and 40 parts of the above-described cyanoethylated polyamide were combined together. The two products were easily mixed together and the mixture did not gel until 96 hours at room temperature. Films prepared from this mixture by heating at ½ hour at 100° C. were very hard and clear and had good solvent resistance. As noted above under Example I, the original Polyamide A was difficult to mix with Polyether A in large proportions and a mixture of 70 parts of Polyether A and 3 parts of the polyamide gelled in 30 minutes at room temperature. Films prepared from this mixture were quite opaque after 2 days at room temperature.

Example III

This example illustrates the preparation of a cyanoethylated polyamide by reacting Polyamide B with acrylonitrile.

135 parts of Polyamide B and 11 parts of acrylonitrile (mole ratio of about 1 to 2) were combined and the mixture heated for one hour at 100° C. The resulting product was a liquid cyanoethylated polyamide which had a lower viscosity than original Polyamide B.

This cyanoethylated polyamide has greatly improved compatibility with polyepoxides, such as Polyethers A, B and C and can be combined therewith in a variety of proportions. The mixtures of the above-noted cyanoethylated polyamide and Polyethers A, B and C also have unexpectedly long shelf life and can be stored or worked for many hours before gelation. Further, the combinations of the above-noted cyanoethylated polyamide and Polyethers A, B and C cure to form very hard, flexible solvent resistant coatings. These superior properties are illustrated by the following typical experiment:

65 parts of Polyether B and 35 parts of the above-described cyanoethylated polyamide were combined together. The two products were easily mixed together and the mixture gelled in 48 hours at room temperature. A 60% solution of the mixture cured at room temperature to form a hard clear film. The original Polyamide B, on the other hand, was rather difficult to mix with Polyether B in large proportions and a mixture of 65 parts of Polyether B and 35 parts of Polyamide B gelled in 24 hours at room temperature. Films prepared from this mixture were quite opaque after 4 days at room temperature.

Example IV

This example illustrates the preparation of a cyanoethylated polyamide by reacting Polyamide B with sufficient acrylonitrile to react with all the amino hydrogen atoms.

135 parts of Polyamide B and 22 parts of acrylonitrile were combined and the mixture heated at 100° C. for 1 hour. The resulting product was a liquid cyanoethylated polyamide having a viscosity which was much lower than the original Polyamide B and was lower than the cyanoethylated product prepared in Example III.

This cyanoethylated polyamide has greatly improved compatibility with polyepoxides, such as Polyethers A, B and C and can be combined therewith in a variety of proportions. The mixtures of the above-noted cyanoethylated polyamide and Polyethers A, B and C also have unexpectedly long shelf life and can be stored or worked for many hours before gelation. Further, the combinations of the above-noted cyanoethylated polyamide and Polyethers A, B and C cure to form hard, flexible solvent resistant coatings. These superior properties are illustrated by the following typical experiment:

60 parts of Polyether B and 40 parts of the above-described cyanoethylated polyamide were combined together. The two products were easily mixed together and the mixture (as 50% solids in xylene) gelled only after 6 days at room temperature. The mixture cured at 100° C. in ½ hour to form a hard clear film. Related results were obtained by combining 55 parts of Polyether B and 45 parts of the cyanoethylated polyamide and by combining 65 parts of Polyether B and 35 parts of the cyanoethylated polyamide. All of these mixtures had lower viscosities than mixtures of Polyether B and Polyamide B itself and much longer shelf life.

*Example V*

This example illustrates the preparation of a cyanoethylated polyamide by reacting acrylonitrile with Polyamide C shown above, and demonstrates the use of such a product as a curing agent for Polyether A.

1 mole of Polyamide C was combined with 4 moles of acrylonitrile and the mixture heated at 150° C. for several hours. The resulting product was a solid having a lower melting point than Polyamide C, itself.

The cyanoethylated polyamide produced above has greatly improved compatibility with Polyether A and can be combined therewith in a variety of proportions. The cyanoethylated polyamide produced above also has a high degree of activity towards Polyether A and acts to cure that resin to form hard, insoluble infusible products having improved flexibility. This is demonstrated by the following experiment. 50 parts of the cyanoethylated polyamide produced above was combined with 50 parts of Polyether A and 50 parts of solvent and the mixture spread out as a thin film on tin panels. The panels were baked at 100° C. for several hours. At that time, the films were very hard and tough and had unexpected flexibility.

*Example VI*

This example illustrates the preparation of a cyanoethylated polyamide by reacting acrylonitrile with a liquid polyamide of succinic acid and diethylene triamine having approximately two $NH_2$ groups and two NH groups.

1 mole of the polyamide was combined with 4 moles of the above-noted polyamide and the mixture heated at 100° C. for several hours. At that time, the product was a liquid having a lower viscosity than the original polyamide.

The cyanoethylated polyamide produced above has greatly improved compatibility with polyepoxides, such as Polyethers A, B and C and can be combined therewith in a variety of proportions. The cyanoethylated polyamide has a high degree of activity towards the polyepoxides and acts to cure polyepoxides to hard, insoluble infusible products having improved flexibility. This is shown by the following experiment. 60 parts of cyanoethylated polyamide produced above was combined with 40 parts of Polyether A and 50 parts of solvent and the mixture spread out as a thin film on tin panels. The panels were baked at 100° C. for several hours. At that time, the films were very hard and tough and had unexpected flexibility.

*Example VII*

This example illustrates the preparation of a cyanoethylated polyamide by reacting acrylonitrile with a thermoplastic solid polyamide of 1,20-eicosanedioic acid and diethylene triamine having approximately two $NH_2$ groups and three NH groups, and the use of this product as a curing agent for polyepoxides.

1 mole of the polyamide was combined with 4 moles of acrylonitrile and the mixture heated at 100° C. for several hours. At that time, the product was a soft slightly yellow colored solid.

The cyanoethylated polyamide produced above has greatly improved compatibility with polyepoxides, such as Polyethers A, B and C and can be combined therewith in a variety of proportions. The cyanoethylated polyamide also has a high degree of activity towards the polyepoxides and acts to cure the polyepoxides to hard, insoluble infusible products having improved flexibility. This is shown by the following experiment. 40 parts of the cyanoethylated polyamide produced above was combined with 60 parts of Polyether A and 30 parts of solvent and the mixture spread out as a thin film on tin panels. The panels were baked at 100° C. for several hours. At that time, the films were very hard and tough and had unexpected flexibility. The above solution was also applied to cellophane and rubber films and cured at 100° C. In each case, the films showed good adhesion and excellent flexibility.

Related results are obtained by replacing the polyamide of eicosanedioic acid and diethylene triamine in the above process with equivalent amounts of each of the following polyamides: polyamide of ethylene diamine and eicosanedioic acid, polyamide of triethylene tetraamine and eicosanedioic acid and a polyamide of hexamethylene diamine and eicosanedioic acid.

I claim as my invention:

1. A cyanoalkylated polyamide of a polycarboxylic acid and an aliphatic polyamine having at least two primary amino groups and possessing at least 12 carbon atoms having from 50% to 100% of the amine hydrogen replaced with —$CH_2CN$ groups.

2. A process for producing a resinified product which comprises mixing a polyepoxide having a

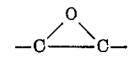

equivalency greater than 1.0 with a thermoplastic cyanoalkylated polyamide of a polycarboxylic acid and an aliphatic polyamine having at least two primary amino groups and having 50% to 100% of the amino hydrogen of said polyamide replaced with —$(CH_2)_2CN$ groups, and heating the mixture to a temperature between 50° C. and 280° C.

3. A process as in claim 2 wherein the polyepoxide is a glycidyl polyether of a polyhydric phenol having a 1,2-epoxy equivalency between 1.1 and 2.0 and a molecular weight between 200 and 900.

4. A process as in claim 2 wherein the cyanoalkylated polyamide is a cyanoethylated polyamide of a polymeric fat acid and an aliphatic polyamine containing no more than 12 carbon atoms.

5. A process as in claim 2 wherein the cyanoalkylated polyamide is a cyanoethylated polyamide of polymeric soyabean oil fatty acids and diethylene triamine.

6. A cyano-substituted polyamide comprising the reaction product of (a) acrylonitrile and (b) a polyamide prepared by reacting a polymeric fatty acid and an aliphatic polyamide selected from the group consisting of diethylene triamine, triethylene tetramine, and tetraethylene pentamine.

7. A process for producing a resinified product which comprises mixing an epoxy compound having a

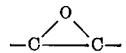

equivalency greater than 1.0, and being the reaction product of Bis-phenol A and epichlorohydrin, with a cyano-substituted polyamide comprising the reaction product of (a) acrylonitrile and (b) a polyamide prepared by reacting a polymeric fatty acid and an aliphatic polyamine selected from the group consisting of diethylene triamine, triethylene tetraamine, and tetraethylene pentamine, and heating to cure the mixture.

8. A cyano-substituted polyamide comprising the reaction product of (a) acrylonitrile and (b) a polyamide prepared by reacting a polymeric fatty acid and diethylene triamine.

References Cited in the file of this patent

UNITED STATES PATENTS

| | | |
|---|---|---|
| 2,548,447 | Shokal et al. | Apr. 10, 1951 |
| 2,705,223 | Renfrew et al. | Mar. 29, 1955 |
| 2,753,323 | Farnham | July 3, 1956 |
| 2,785,092 | Hiestand et al. | Mar. 12, 1957 |

FOREIGN PATENTS

| | | |
|---|---|---|
| 404,744 | Great Britain | Jan. 25, 1934 |
| 679,562 | Great Britain | Sept. 17, 1952 |